(12) United States Patent
Kandala

(10) Patent No.: US 7,187,668 B2
(45) Date of Patent: Mar. 6, 2007

(54) DEVICES, SOFTWARES AND METHODS FOR ADVANCING SCHEDULING OF NEXT CONTENTION SESSION UPON PREMATURE TERMINATION OF CONTENTION FREE EXCHANGE

(75) Inventor: Srinivas Kandala, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 841 days.

(21) Appl. No.: 09/995,296

(22) Filed: Nov. 27, 2001

(65) Prior Publication Data

US 2002/0122409 A1   Sep. 5, 2002

Related U.S. Application Data

(60) Provisional application No. 60/273,278, filed on Mar. 2, 2001.

(51) Int. Cl.
  *H04Q 7/24* (2006.01)
  *H04L 12/26* (2006.01)
  *H04L 12/413* (2006.01)
  *H04J 3/02* (2006.01)

(52) U.S. Cl. .................. 370/338; 378/252; 378/462; 378/445

(58) Field of Classification Search ............ 370/348, 370/468, 310, 395.4, 445; 709/236, 238
See application file for complete search history.

(56) References Cited

U.S. PATENT DOCUMENTS

| | | | |
|---|---|---|---|
| 6,970,422 B1* | 11/2005 | Ho et al. | 370/230 |
| 2002/0150095 A1* | 10/2002 | Sherman | 370/389 |
| 2002/0163933 A1* | 11/2002 | Benveniste | 370/465 |

* cited by examiner

*Primary Examiner*—Steven Nguyen
(74) *Attorney, Agent, or Firm*—Marger Johnson & McCollom, P.C.

(57) ABSTRACT

Devices, softwares and methods advance the scheduling of a next contention session upon premature termination of a contention free session. A Hybrid Coordinator detects when the exchange of wireless transmissions finishes before the contention free window is scheduled to end. Upon such detection, the Hybrid Coordinator transmits a notification to advance the scheduling of the next contention session. Upon sensing the notification, contention resumes by the participating peripherals.

29 Claims, 6 Drawing Sheets

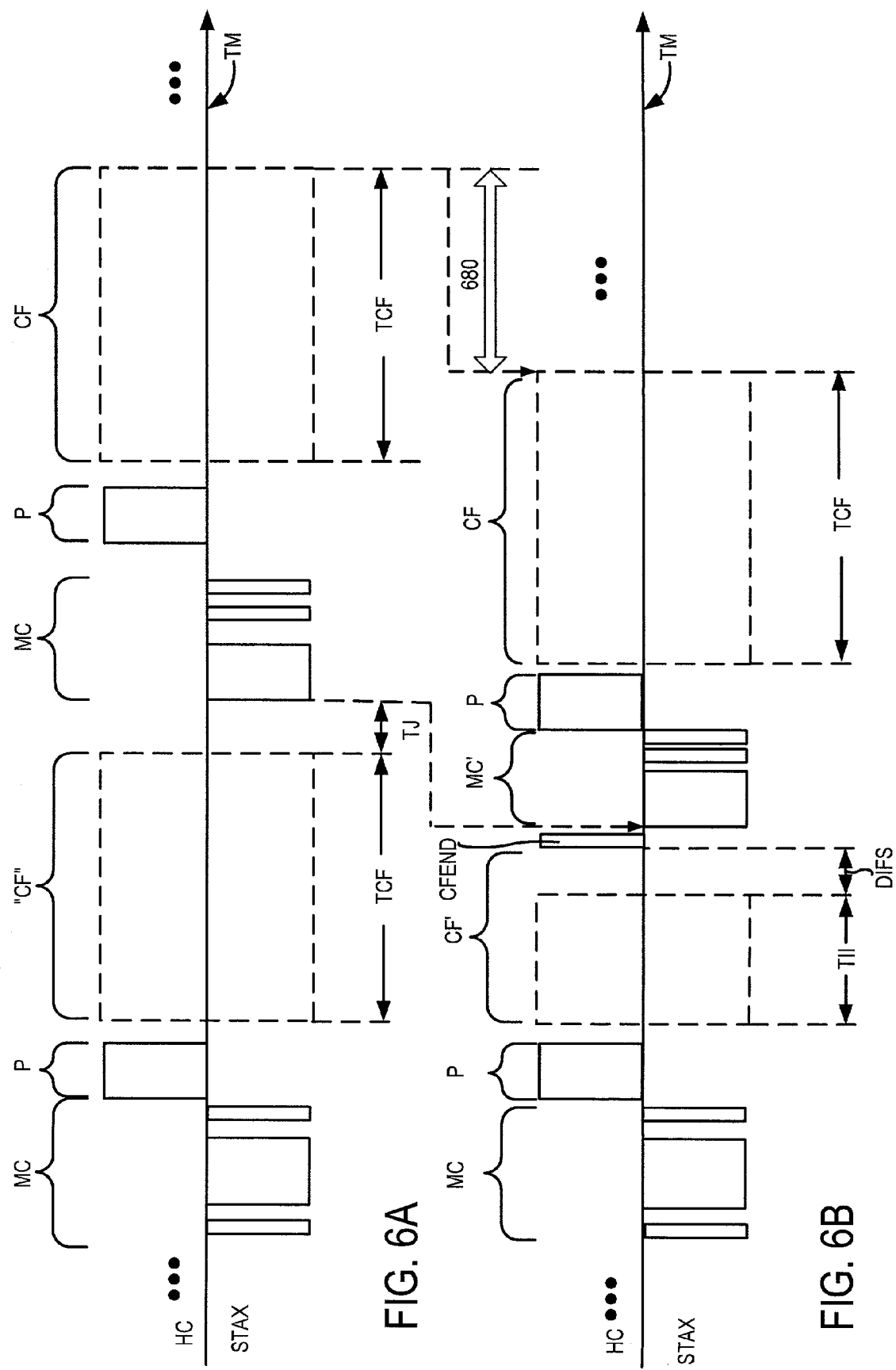

DEVICES, SOFTWARES AND METHODS FOR ADVANCING SCHEDULING OF NEXT CONTENTION SESSION UPON PREMATURE TERMINATION OF CONTENTION FREE EXCHANGE

CROSS REFERENCE TO RELATED APPLICATIONS

This application claims priority from U.S.A. Provisional Application No. 60/273,278, filed on Mar. 2, 2001, the disclosure of which is hereby incorporated by reference for all purposes.

This application may be found to be related to U.S.A. patent application Ser. No. 09/823,511 filed on Mar. 30, 2001, the disclosure of which is herein incorporated by reference for all purposes.

BACKGROUND OF THE INVENTION

1. Field of the Invention

The present invention is related to the field of wireless communications between devices that participate in forming a wireless network, and more specifically to devices, softwares and methods for advancing scheduling of a next contention session in a wireless network if a scheduled exchange terminates before its scheduled window.

2. Description of the Related Art

Local area networks (LANs) are increasingly used to transfer data. A relatively new application is wireless LANs, also known as WLANs. These can provide the benefits of a wired LAN, without requiring the different stations to be physically coupled to each other. There is no need for procuring transmission wires such as coaxial conductors, twisted pairs of wires, optical fibers, etc. for transferring the data. Instead, the data is transferred through space, either using radio frequency (RF) waves (that are also known as microwaves), or optical frequency waves, such as infrared (IR) light. A network may be formed by bringing components close together, without the need to plug transmission wires to them.

Referring to FIG. 1, an example of a WLAN is shown. A Hybrid Coordinator device HC 120 is a device that performs admission control and schedules transmission opportunities. Device HC 120 is brought close to a first wireless station STA1 140, a second wireless station STA2 150, and a third wireless station STA3 160. HC 120 may establish a wireless communication link 145 with STA1 140, a link 155 with STA2 150, and a link 165 with STA3 160.

Wireless links 145, 155, and 165 share the same medium 168, which is typically air. Every device in the medium can receive what the others are transmitting. If many are transmitting at the same time, there would be problems (corrupting of data, etc.). Accordingly, only one should be permitted to transmit at a time.

Concurrent transmission is typically avoided by requiring all devices HC 120, STA1 140, STA2 150, STA3 160 to comply with protocols. Many such protocols are being developed under the aegis of the Institute of Electrical and Electronic Engineers (IEEE). An applicable protocol for WLANs is being developed in terms of IEEE Standard 802.11.

Referring to FIG. 2A, operation of at least one protocol is described. A time axis TM designates times of the events. Pulses shown above the time axis TM are those transmitted by HC 120, while those below axis TM are transmitted by devices STA1 140, STA2 150, STA3 160. Devices STA1 140, STA2 150, STA3 160 are collectively designated as STAX.

The protocol works by having HC control when each device may transmit. As time goes on, HC 120 periodically establishes intervals MC of contention for the medium 168, followed by polling pulse intervals P, followed by contention free intervals CF.

During medium contention intervals MC, devices STA1 140, STA2 150, STA3 160 are free to transmit requests for use of the medium 168, at the expense of each other. These are requests for reserving resources, such as bandwidth and memory, and are therefore also known as reservation requests.

Afterwards HC 120 processes the contending reservation requests, and resolves them. In other words, it generates a schedule for when each one of devices STA1 140, STA2 150, STA3 160 should transmit.

During the polling pulse interval P, HC 120 announces the schedules of which device (or pair of devices) may transmit during the next contention free interval CF. Announcing is by usually transmitting a poll frame, which is referred to as "QoS CF poll frame" in the IEEE 802.11e standard. All devices STA1 140, STA2 150, STA3 160 receive it, and all must comply.

During a contention free interval CF, only those devices scheduled by HC 120 may transmit data. The others must neither exchange data, nor contend for the medium 168. A single contention free interval CF may be scheduled for a session of only one exchange at a time. Sometimes there can be two or more exchanges scheduled in a row in a single contention free session. Each exchange may be between two devices that exchange data, acknowledgement pulses, etc. But before contending again, devices STA1 140, STA2 150, STA3 160 wait for the next medium contention interval MC.

A contention free interval is scheduled for time TCF. Afterwards there is a minimum time interval TJ that must be observed, before contention begins again. Time interval TJ must be of a very short time duration. This way the continuity will not be broken, and any other device that may want to contend for medium 168 will have to continue waiting.

Radio based WLANs have several characteristics which differ from those of wired LANs. These characteristics include lower achievable data capacity, which is due to a number of factors, such as bandwidth limitations. That is why it is desirable to not waste time in such communications.

Referring now to FIG. 2B, a situation is shown where time is wasted. Everything is the same as in FIG. 2A, except that the transmissions during the first contention free window "CF" last only for time period T11, which is less than the allotted TCF.

This may happen for a number of reasons. For example, the amount of the data in the buffer may have needed only a shorter transmission opportunity. Or one of the devices STA1 140, STA2 150, STA3 160 may have used an acknowledgement policy, but has not received any, and thus ceased transmission. Or simply the device has lost its association.

When that happens, this leaves a quiet time window TQ. It is quiet because no device is transmitting, as every device is waiting for another device to transmit.

Quiet time window TQ is merely wasted time at best. Worse, window TQ may be larger than the duration of TJ, or a designated Short Inter Frame Space (SIFS) of the connection. This engenders the possibility that a device may seek to establish a connection with HC 120. Such a device may either be a non-compliant device, or even a compliant device that has been brought close, and may fairly interpret the long duration of quiet time window TQ as a suitable opportunity to submit a reservation request.

This way the new device will start contending at the expense of the established ones. It may win, because the existing devices which will not even be contending. This will break the continuity, and force rescheduling, which is inefficient. In the worst case, there could be collision.

BRIEF SUMMARY OF THE INVENTION

The present invention overcomes these problems and limitations of the prior art.

Generally, the present invention provides devices, softwares and methods for advancing the scheduling of the next contention session upon premature termination of a contention free session. The invention teaches for a Hybrid Coordinator to detect when the exchange of wireless transmissions finishes before the contention free window is scheduled to end. Upon such detection, the Hybrid Coordinator transmits a notification to advance the scheduling of the next contention session. Upon sensing the notification, contention resumes by the participating peripherals.

The invention offers the advantage that time is not wasted, and quiet windows are not permitted to occur.

The invention will become more readily apparent from the following Detailed Description, which proceeds with reference to the drawings, in which:

BRIEF DESCRIPTION OF THE DRAWINGS

FIG. 6A is a timing diagram of exchanges between the devices of FIG. 3 operating at normal conditions according to the present invention.

FIG. 6B is a timing diagram of exchanges between the devices of FIG. 3 operating at the special condition of FIG. 2B according to the present invention.

DETAILED DESCRIPTION OF THE PREFERRED EMBODIMENT(S)

As has been mentioned, the present invention provides devices, softwares and methods for advancing the scheduling of the next contention session upon a premature termination of a contention free session. The invention is now described in more detail.

Figure 3:
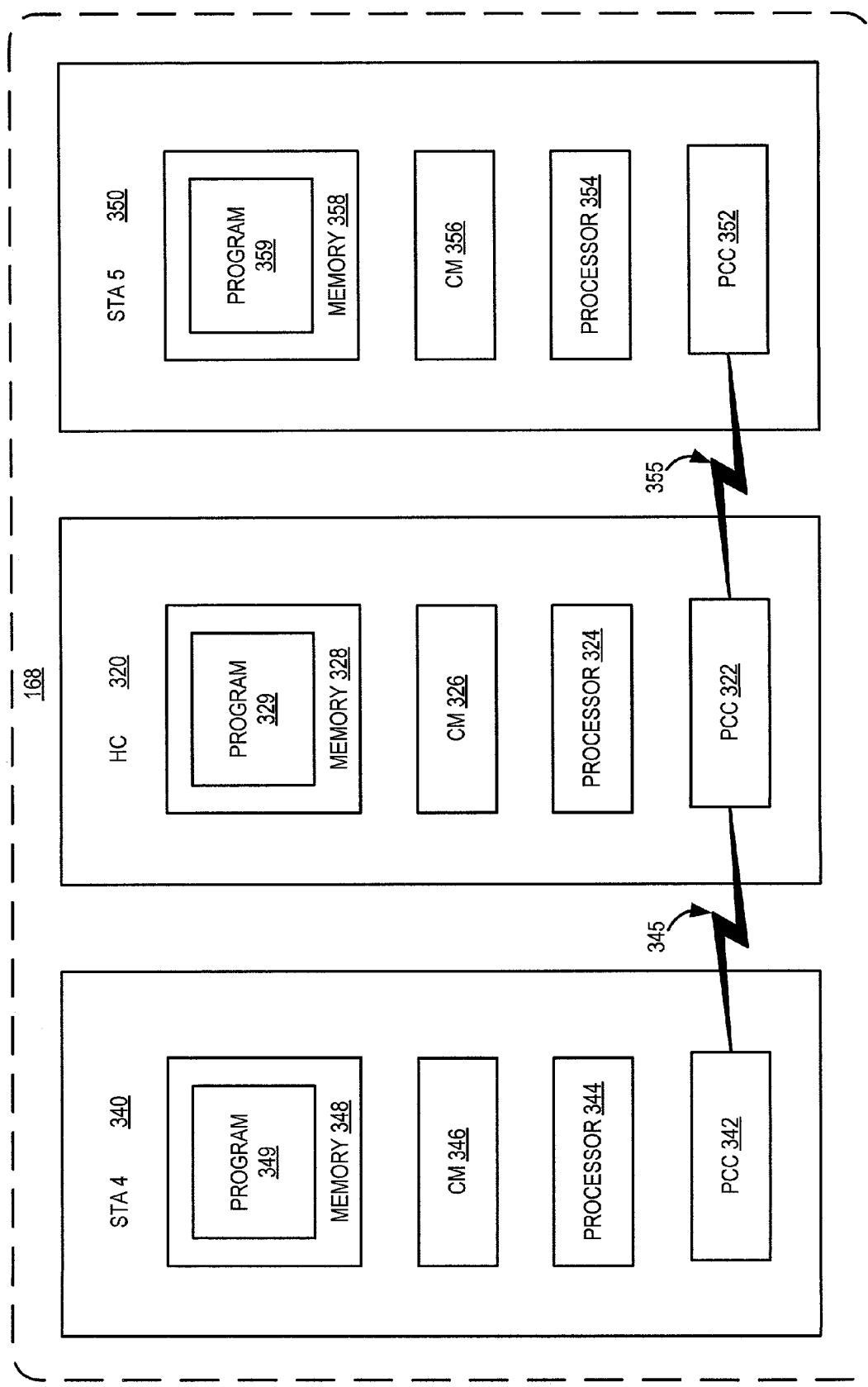
FIG. 3 is a block diagram of a Hybrid Coordinator made according to an embodiment of the invention, and of two peripheral stations STA4, STA5 made according to embodiments of the invention, all forming a WLAN.

Referring now to FIG. 3, block diagrams are shown of three devices 320, 340, 350 which may form a WLAN according to the present invention. The WLAN may be in medium 168, although that is not necessary. One or both of devices 340, 350 need not be made according to the invention, as will be understood from the below.

Communication device HC 320 made according to an embodiment of the invention is now described in more detail. Device HC 320 may be any wireless communication device that can act as a Hybrid Coordinating device.

Device HC 320 has a physical communication component PCC 322 for communicating with other devices. PCC 322 may be a transmitting and receiving component that uses infra red light (IR), radio frequency (RF) waves that are also known as microwaves, etc.

Device HC 320 also has a processor 324 coupled with component 322. Processor 324 may be implemented as a Digital Signal Processor (DSP), Central Processing Unit (CPU), or any other equivalent way known in the art.

Device HC 320 may additionally include a memory 328, on which a program 329 may reside. Functions of processor 324 may be controlled by program 329, as will become apparent from the below.

Device HC 320 additionally includes a contention control mechanism CM 326. This may be implemented as part of program 329, or as part of processor 324, or otherwise.

Still referring to FIG. 3, communication device STA4 340 made according to an embodiment of the invention is now described in more detail. Device STA4 340 may be any wireless communication device that complies with commands issued from device HC 320.

Device STA4 340 has a physical communication component PCC 342 for communicating with other devices, such as device HC 320. PCC 342 may be a transmitting and receiving component that uses infra red light (IR), radio frequency (RF) waves that are also known as microwaves, etc. PCC 342 may establish a link 345 with PCC 322 of device HC 320.

Device STA4 340 also has a processor 344 coupled with component 342. Processor 344 may be implemented as a Digital Signal Processor (DSP), Central Processing Unit (CPU), or any other equivalent way known in the art.

Device STA4 340 may additionally include a memory 348, on which a program 349 may reside. Functions of processor 344 may be controlled by program 349, as will become apparent from the below.

Device STA4 340 additionally includes a contention control mechanism CM 346. This may be implemented as part of program 349, or as part of processor 344, or otherwise.

Continuing to refer to FIG. 3, communication device STA5 350 made according to an embodiment of the invention is now described in more detail. Device STA5 350 may be any wireless communication device that complies with commands issued from device HC 320.

Device STA5 350 has a physical communication component PCC 352 for communicating with other devices, such as device HC 320. PCC 352 may be a transmitting and receiving component that uses infra red light (IR), radio frequency (RF) waves that are also known as microwaves, etc. PCC 352 may establish a link 355 with PCC 322 of device HC 320.

Device STA5 350 also has a processor 354 coupled with component 352. Processor 354 may be implemented as a Digital Signal Processor (DSP), Central Processing Unit (CPU), or any other equivalent way known in the art.

Device STA5 350 may additionally include a memory 358, on which a program 359 may reside. Functions of processor 354 may be controlled by program 359, as will become apparent from the below.

Device STA5 350 additionally includes a contention control mechanism CM 356. This may be implemented as part of program 359, or as part of processor 354, or otherwise.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 4:
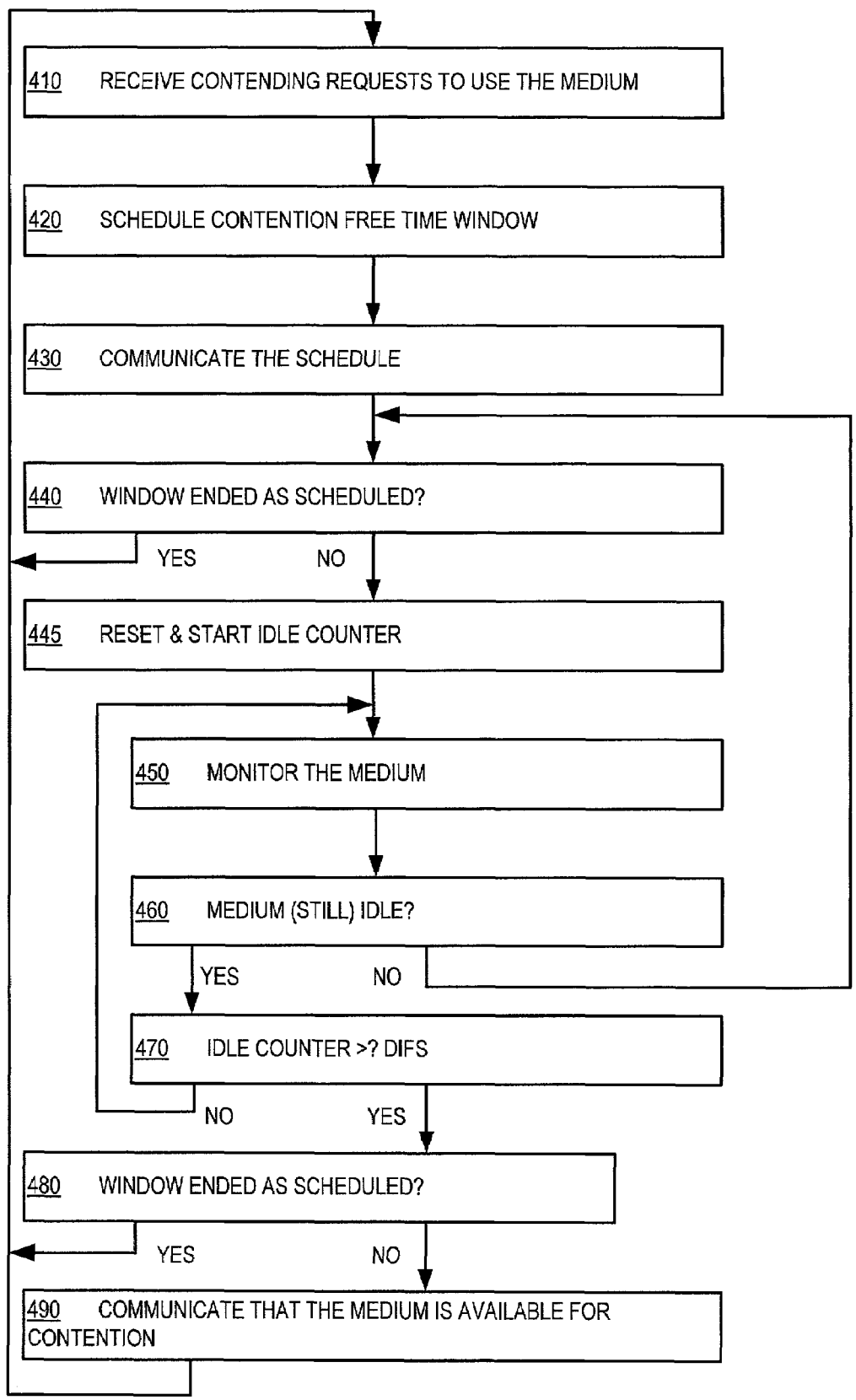
FIG. 4 is a flowchart illustrating a method according to an embodiment of the present invention.

Referring now to FIG. 4, a flowchart 400 is used to illustrate a method according to an embodiment of the invention. The method of flowchart 400 may also be practiced by device HC 320 of FIG. 3.

According to a box 410, contending requests are received. The contending requests are to use the medium for respective data transmissions.

According to a next box 420, a contention free time window is scheduled. During the scheduled contention free time window, any subsequent contending requests are impermissible.

According to a next box 430, the schedule is communicated. This may be accomplished by the polling pulse, which may also start the scheduled ending time.

According to a next box 440, it is inquired whether the window ended as was scheduled. If yes, then execution returns to box 410.

If not, then according to a next box 445, an idle counter is reset and started. The idle counter preferably counts up.

According to a next box 450, the medium is monitored. It is sought to determine if the medium has been idle (no transmissions) for some time, and whether that idle time exceeds a preset minimum.

According to an optional next box 460, it is inquired whether the monitored medium is idle. If not, then execution returns to box 440.

If yes, then according to a next box 470, it is inquired whether the idle counter has been counting for at least a minimum preset time. The preset minimum time may equal a relevant pulse interframe spacing, such as a designated Distributed Inter Frame Space (DIFS) of the connection. If not, then execution returns to box 450.

If yes, then according to an optional next box 480, it is inquired whether the window had ended as scheduled. If yes, then execution returns to box 410.

If not, then it is determined that one of the data transmissions through the monitored medium ended before the initially scheduled ending time of the contention free time window. According to a next box 490, it is communicated that the medium is available for contention. That means communicating that subsequent contending requests are permissible, even if they are made before the initially scheduled ending time.

Figure 5:
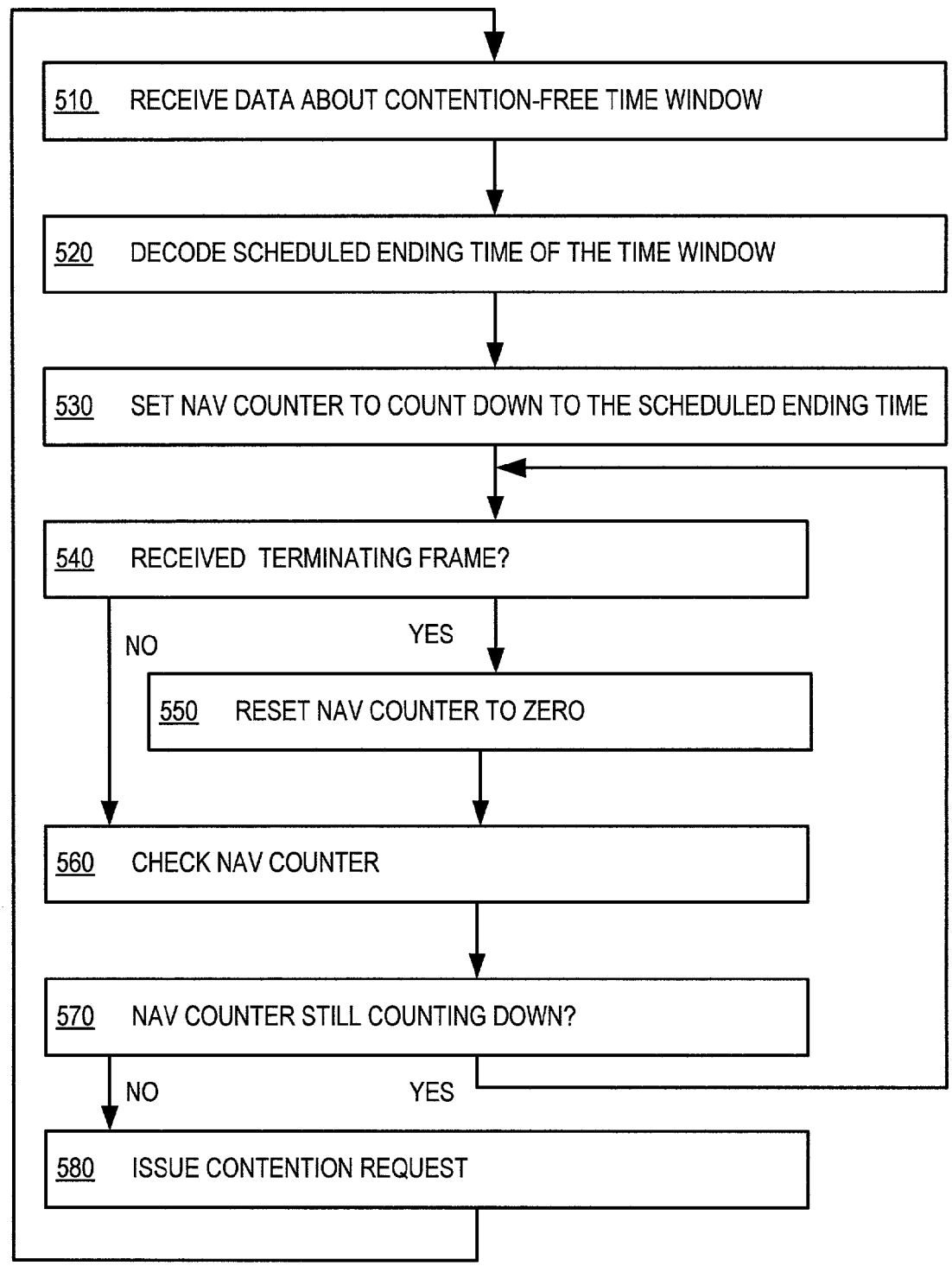
FIG. 5 is a flowchart illustrating a method according to another embodiment of the present invention.

Referring now to FIG. 5, a flowchart 500 is used to illustrate a method according to another embodiment of the invention. The method of flowchart 500 may also be practiced by either one or both of devices STA4 340 and STA5 350 of FIG. 3.

According to a box 510, data is received about a contention-free time window. Such data would be typically received wirelessly from a Hybrid Command device.

According to a next box 520, a scheduled ending time is decoded from the data. The ending time is of the contention free time window. Equivalently, a duration is decoded, and the ending time is determined locally, from noting the beginning time.

Then a contention mechanism is adjusted to prevent contending for the medium before the scheduled ending time. For example, a count down counter is set to count down commensurately with the scheduled ending time. In this particular case, according to a next box 530, the count down counter is set to count down to the scheduled ending time. A counter for this purpose is sometimes also called a NAV counter. This is a different counter from the idle counter described in connection with FIG. 4.

Then a notification may be received that contention will be permitted before the scheduled ending time. The notification may be by receiving and interpreting a terminating frame. Accordingly, it is inquired in a next box 540 whether a terminating frame has been received.

If yes, then the medium will be contended for again, before the scheduled ending time. This may be accomplished by readjusting the contention mechanism pursuant to the notification. Readjusting would be to enable contending for the medium before the scheduled ending time. For example, the count down counter may be advanced to a smaller value, such as zero. According to a next box 550, therefore, the NAV counter is reset to zero.

According to a next box 560, the NAV counter is checked. Box 560 is executed also is a notification (such as pulse CF END) has not been received at box 540. Box 560 may be checked every time that there is a desire to content for the medium.

According to a next box 570, it is determined whether the NAV counter is still counting down. If yes, contention is still prohibited, and execution returns to box 540.

If not, then according to an optional next box 580, a contention request is issued. That may be even before the initially scheduled ending of the contention free time window. It may have been enabled because, at box 550, the NAV counter was reset to zero.

Referring now to FIG. 6A and FIG. 6B, the effect of the invention is described.

Figure 1:
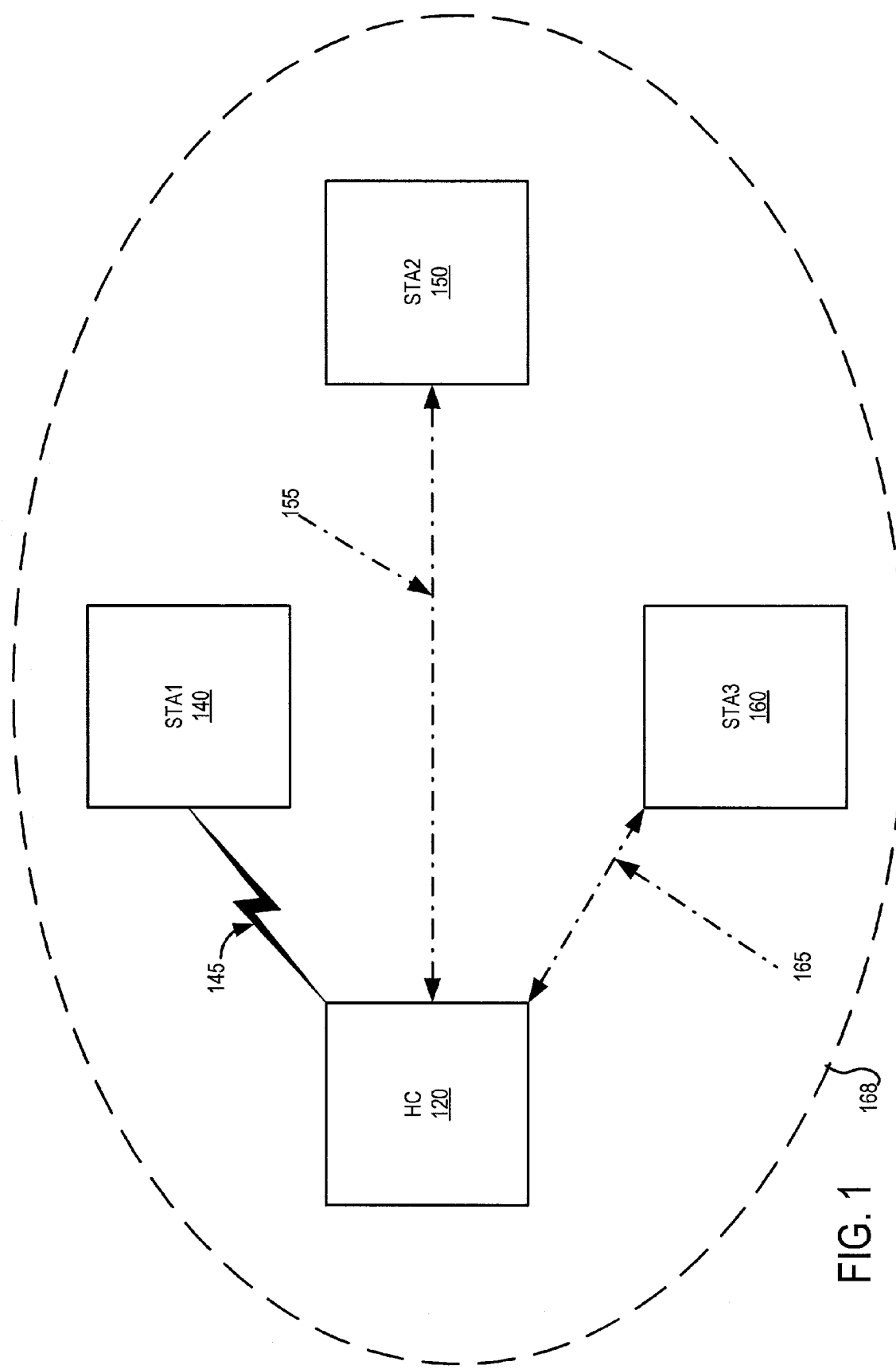
FIG. 1 is a diagram of devices forming a WLAN in the prior art.
Figures 2A, 2B:
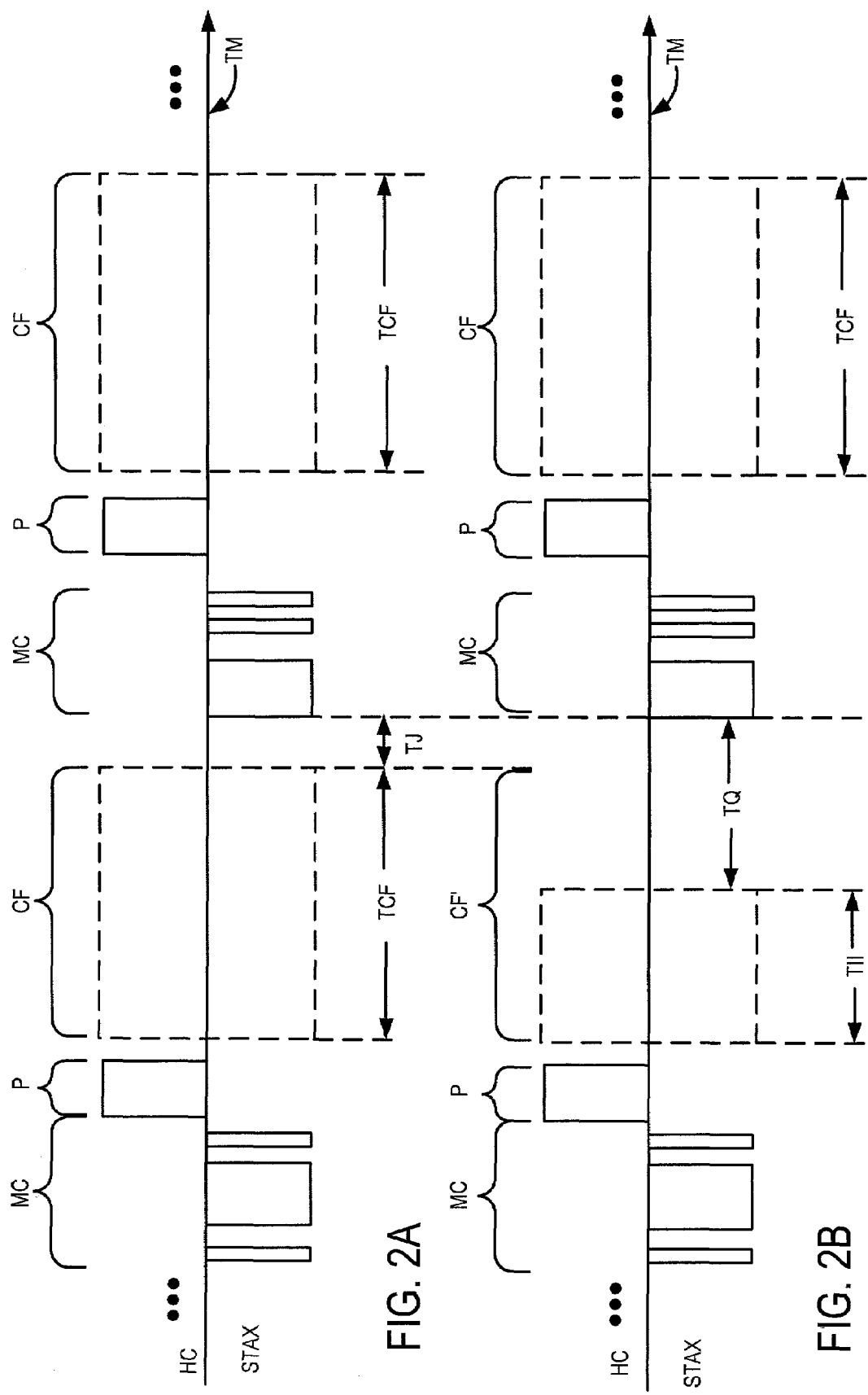
FIG. 2A is a timing diagram of exchanges between the devices of FIG. 1 operating at normal conditions according to a prior art protocol.
FIG. 2B is a timing diagram of exchanges between the devices of FIG. 1 operating at a special condition according to the protocol of FIG. 2A.

FIG. 6A is identical to FIG. 2A. It describes operation of the invention in the event that there are no wasted time intervals between the devices of the WLAN of FIG. 3.

FIG. 6B shows transmissions during a contention free cession CF' terminate early, after a time of only T11. Accordingly, the Hybrid Coordinator device involved here will wait for a time DIFS, to confirm the end of the transmissions. Then the HC device will issue a CF END pulse, which will start the next medium contention interval MC'. This is at an earlier time than would have happened without the invention.

It will be appreciated that rescheduling may happen after a contention free session with either the first device or the second device. Labels given in this document such as first and second are interchangeable.

The effect of rescheduling can be seen by comparing FIG. 6B to FIG. 6A, and to FIG. 2A and FIG. 2B. The last contention free session CF finishes a time duration 680 ahead in FIG. 6B, than in FIG. 6A, and thus also in FIG. 2B. This is not only time saved, but a possible interruption was further prevented.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A computer readable medium having stored thereon computer-executable instructions that, when executed by a processor of a computer system to perform the following:
   receiving contending requests for respective non-contending wireless data transmissions through a medium;
   scheduling an ending time of a time window for the non-contending wireless data transmissions during which all contending requests are impermissible;
   communicating the scheduled ending time;
   monitoring the medium;
   determining that one of the wireless non-contending wireless data transmissions through the monitored medium ended before the scheduled ending time;
   communicating that subsequent transmitting of contending requests for subsequent non-contending wireless data transmissions are permissible before the scheduled ending time;
   receiving transmitted contending requests for requesting reservation of subsequent non-contending wireless data transmissions before the scheduled ending time; and
   scheduling a new time window for other non-contending wireless data transmissions during which contending requests are impermissible according to the contending requests received before the scheduled ending time.

2. The computer readable medium of claim 1, in which the instructions further result in:
   detecting an idle time in the medium; and comparing the idle time to a preset minimum time;
and in which the non-contending wireless data transmission is determined to have ended if the idle time is longer than the preset minimum time.

3. The computer readable medium of claim 1 including:
adjusting a contention mechanism to prevent contending for the medium before the scheduled ending time; and
pursuant to a notification readjust the contention mechanism to enable transmitting the requests for contending for the medium before the scheduled ending time.

4. The computer readable medium of claim 2, in which the preset minimum time equals a DIFS (distributed coordination function inter-frame space).

5. A computer readable medium having stored thereon computer-executable instructions that, when executed by a processor of a computer system, cause said processor to:
receive data about a contention-free time window regarding a medium;
decode from the data a scheduled ending time of the time window;
then receive notification that contention will be permitted before the scheduled ending time;
transmit requests to contend for the medium for reserving a next contention-free time window before the scheduled ending time pursuant to the notification;
adjust a contention mechanism to prevent contending for the medium before the scheduled ending time; and
pursuant to the notification readjust the contention mechanism to enable transmitting the requests for contending for the medium before the scheduled ending time.

6. The computer readable medium of claim 5, in which receiving notification includes receiving and interpreting a terminating frame.

7. The computer readable medium of claim 5, in which adjusting the contention mechanism includes setting a counter to count down commensurately with the scheduled ending time, and
readjusting the contention mechanism includes advancing the counter to a smaller value.

8. The computer readable medium of claim 7, in which the smaller value is zero.

9. A device comprising:
means for receiving contending requests for reserving respective non-contending wireless transmissions through a medium;
means for scheduling an ending time of a time window during which subsequent contending requests are impermissible;
means for communicating the scheduled ending time;
means for monitoring the medium during the non-contending wireless transmissions;
means for determining that one of the non-contending wireless transmissions through the monitored medium ended before the scheduled ending time;
means for communicating that transmitting additional subsequent contending requests for reserving other non-contending wireless transmissions are permissible even if made before the scheduled ending time;
means for adjusting a contention mechanism to prevent contending for the medium before the scheduled ending time;
means for readjusting the contention mechanism to enable contending for the medium before the scheduled ending time pursuant to a notification.

10. The device of claim 9, further comprising:
means for detecting an idle time in the medium; and
means for comparing the idle time to a preset minimum time;
and in which the wireless transmissions are determined to have ended if the idle time is longer than the preset minimum time.

11. The device of claim 10, in which
the preset minimum time equals a DIFS.

12. A device comprising:
means for receiving data about a contention-free time window regarding a medium;
means for decoding from the data a scheduled ending time of the time window;
means for then receiving notification that contention will be permitted before the scheduled ending time for the contention-free window;
means for transmitting contending requests for the medium before the scheduled ending time for reserving another contention-free window for sending data pursuant to the notification;
means for adjusting a contention mechanism to prevent contending for the medium before the scheduled ending time; and
means for readjusting the contention mechanism to enable contending for the medium before the scheduled ending time pursuant to the notification.

13. The device of claim 12, in which
the means for receiving notification includes receiving and interpreting a terminating frame.

14. The device of claim 12, in which
the means for adjusting the contention mechanism includes means for setting a counter to count down commensurately with the scheduled ending time, and
the means for readjusting the contention mechanism includes means for advancing the counter to a smaller value.

15. The device of claim 14, in which
the smaller value is zero.

16. A computer readable medium having stored thereon computer-executable instructions that, when executed by a processor of a computer system to perform the following:
receiving contending requests for respective non-contending wireless transmissions through a medium;
scheduling an ending time of a non-contending time window during which subsequent contending requests are impermissible;
communicating the scheduled ending time;
monitoring the medium;
determining that one of the non-contending wireless transmissions through the monitored medium ended before the scheduled ending time;
communicating that subsequent contending requests can be transmitted for reserving subsequent non-contending wireless transmissions even if made before the scheduled ending time;
adjusting a contention mechanism to prevent contending for the medium before the scheduled ending time; and
pursuant to a notification readjusting the contention mechanism to enable transmitting contending requests for reserving the medium before the scheduled ending time.

17. The computer readable medium of claim 16, in which the instructions further result in:
detecting an idle time in the medium; and
comparing the idle time to a preset minimum time;
and in which the non-contending wireless transmissions are determined to have ended if the idle time is longer than the preset minimum time.

18. The computer readable medium of claim 17, in which the instructions further result in:
  starting an idle counter if the medium is detected to be idle.

19. A computer readable medium having stored thereon computer-executable instructions that, when executed by a processor of a computer system to perform the following:
  receiving data about a contention-free tune window regarding a medium;
  decoding from the data a scheduled ending time of the time window;
  receiving notification that transmitting contention requests for reserving a next contention-free window will be permitted before the scheduled ending time;
  transmitting contending requests for reserving the medium for transmitting data in the next contention-free window before the scheduled ending time pursuant to the notification;
  adjusting a contention mechanism to prevent contending for the medium before the scheduled ending time; and
  pursuant to the notification readjusting the contention mechanism to enable transmitting contending requests for reserving the medium before the scheduled ending time.

20. The computer readable medium of claim 19, in which receiving notification includes receiving and interpreting a terminating frame.

21. The computer readable medium of claim 19, in which
  adjusting the contention mechanism includes setting a counter to count down commensurately with the scheduled ending time, and
  readjusting the contention mechanism includes advancing the counter to a smaller value.

22. The computer readable medium of claim 21, in which the smaller value is zero.

23. A method comprising:
  receiving transmitted contending requests for respective non-contending wireless transmissions through a medium;
  scheduling an ending time of a time window during which transmitting subsequent contending requests are impermissible;
  communicating the scheduled ending time;
  monitoring the medium;
  determining that one of the wireless transmissions through the monitored medium ended before the scheduled ending time;
  communicating a terminating frame that indicates transmitting subsequent contending requests are permissible for reserving a next non-contending wireless transmission even if made before the scheduled ending time;
  receiving transmitted contending requests before the scheduled ending time for requesting reservation of the next non-contending wireless transmission in response to communicating the terminating frame,
  adjusting a contention mechanism to prevent transmitting the contention requests for the medium before the scheduled ending time; and
  pursuant to a notification readjusting the contention mechanism to enable transmitting the contention requests for the medium before the scheduled ending time.

24. The method of claim 23, further comprising:
  detecting an idle time in the medium; and
  comparing the idle time to a preset minimum time;
  and in which the wireless transmission is determined to have ended if the idle time is longer than the preset minimum time.

25. The method of claim 24, further comprising:
  starting an idle counter if the medium is detected to be idle.

26. A method comprising:
  receiving data about a contention-free time window for transporting information over a medium;
  decoding from the data a scheduled ending time of the time window;
  receiving notification that transmitting a contention request will be permitted before the scheduled ending time of the contention-free window;
  transmitting the contention request for requesting transporting information contention-free over the medium before the scheduled ending time pursuant to the notification;
  adjusting a contention mechanism to prevent transmitting the contention requests for the medium before the scheduled ending time; and
  pursuant to the notification readjusting the contention mechanism to enable transmitting the contention requests for the medium before the scheduled ending time.

27. The method of claim 26, in which
  receiving notification includes receiving and interpreting a terminating frame.

28. The method of claim 26, in which
  adjusting the contention mechanism includes setting a counter to count down commensurately with the scheduled ending time, and
  readjusting the contention mechanism includes advancing the counter to a smaller value.

29. The method of claim 28, in which the smaller value is zero.

* * * * *

UNITED STATES PATENT AND TRADEMARK OFFICE
CERTIFICATE OF CORRECTION

| | | |
|---|---|---|
| PATENT NO. | : 7,187,668 B2 | Page 1 of 1 |
| APPLICATION NO. | : 09/995296 | |
| DATED | : March 6, 2007 | |
| INVENTOR(S) | : Srinivas Kandala | |

It is certified that error appears in the above-identified patent and that said Letters Patent is hereby corrected as shown below:

Column 11, line 8, claim 19, delete "tune" and insert --time-- therefor.

Column 11, line 21, claim 19, delete the first instance of "the" and insert --a-- therefor.

Signed and Sealed this

Thirty-first Day of July, 2007

JON W. DUDAS
*Director of the United States Patent and Trademark Office*